United States Patent
Singh et al.

(10) Patent No.: US 7,711,656 B2
(45) Date of Patent: May 4, 2010

(54) SYSTEM AND METHOD FOR MANAGING AND CHARGING FOR DATA STORAGE DEVICES

(75) Inventors: Harpreet Singh, Orange, CA (US); Marianne Kodimer, Huntington Beach, CA (US); Mustafa Seifi, Irvine, CA (US); Ken Stephenson, San Clemente, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 743 days.

(21) Appl. No.: 11/183,713

(22) Filed: Jul. 18, 2005

(65) Prior Publication Data

US 2007/0016537 A1 Jan. 18, 2007

Related U.S. Application Data

(63) Continuation-in-part of application No. 11/089,985, filed on Mar. 25, 2005.

(51) Int. Cl.
*G06F 17/00* (2006.01)
*G06G 7/00* (2006.01)
(52) U.S. Cl. ...................................... 705/400
(58) Field of Classification Search ................... 705/400
See application file for complete search history.

(56) References Cited

U.S. PATENT DOCUMENTS 6,618,810 B1 * 9/2003 Dirie ........................... 726/27
2001/0056388 A1 * 12/2001 Yamazaki ..................... 705/32
2002/0083079 A1 * 6/2002 Meier et al. ............... 707/104.1
2003/0110190 A1 * 6/2003 Achiwa et al. ............... 707/203
2006/0020561 A1 * 1/2006 Kodimer et al. ............. 705/400

OTHER PUBLICATIONS http://web.archive.org/web/20021217094818/www.xdrive.com/support/library.jsp?section=billing&doc=B100002.htm archive retrieval of Xdrive.com pages from Dec. 17, 2002.*
"Retail advertising and catalogs. (sessions held to spotlight new technologies; various product announcements, developments) (Special Report: Seybold Seminars Boston '94, Part II) (Product Announcement)" Seybold Report on Publishing Systems , v23, n16, p. S56(6) May 10, 1994.*

* cited by examiner

*Primary Examiner*—John W Hayes
*Assistant Examiner*—Allen J Jung
(74) *Attorney, Agent, or Firm*—Tucker Ellis & West LLP

(57) ABSTRACT

A system and method for data service management of electronic files. A user selects the file or files to be stored on a remote storage device. The user is also able to selectively scan to archive, or storage, a document or other data. The user then selects the appropriate payment option. The user is presented with the total cost of the service, and upon acceptance, the selected service is performed. The details of the transaction are archived and the user is billed for the service. The fees charged are based on the number of pages of the document, file, or other data stored. The fees are charged at the commencement of the services, rather than each day. The fees are also based on the location form which the services are accessed based on selected criteria of such location. Renewal of the storage duration includes fees are those fees charged when the document, file, or other data was first stored.

12 Claims, 8 Drawing Sheets

SYSTEM AND METHOD FOR MANAGING AND CHARGING FOR DATA STORAGE DEVICES

This application is a continuation-in-part of U.S. patent application Ser. No. 11/089,985, entitled SYSTEM FOR GENERATING A USER INTERFACE AND SERVICE COST DISPLAY FOR MOBILE DOCUMENT PROCESSING SERVICES, filed Mar. 25, 2005.

BACKGROUND

This invention is directed to a system and method for managing and charging for data storage and management services. More particularly, this invention allows users in a non-office environment to temporarily store and manage documents, files, or other data, and to be charged for such services.

Typically, professionals routinely work with documents or other data while away from their office environment. These professionals or other mobile users often need to temporarily store or manage such documents or other data. In most storage based systems, users are charged for storage services based on the amount of disk space used to store the document or data and are charged on a per day basis. In addition, the charges generally increase over time, thereby making storage of a document or electronic data file an increasing expense.

Previous attempts to provide remote data storage do not allow for the payment of storage based upon the location from which the file to be stored originates. The present storage based systems further lack the ability to determine the number of pages of a file being stored and combining such page information with the storage location. Current implementations lack the ability to factor in the different data storage costs incurred by providers in maintaining data storage equipment. These systems do not take into account the different physical locations in which the storage is accessed. For example, the costs associated with operating data storage equipment or uploading equipment will vary from a region to region. In addition, power costs, network speeds, bandwidth costs, all vary depending upon the location. The current technology does not allow a provider to distinguish the cost for storage based on location.

There is a need for an improved system and method for managing and charging for data storage and management services.

SUMMARY OF INVENTION

In accordance with the present invention, there is provided a system and method for managing and charging for data storage and management services.

Further, in accordance with the present invention, there is provided a system and method which allows users in a non-office environment to temporarily store and manage documents, files, or other data, and to be charged for such services.

Further, in accordance with the present invention, there is provided a system and method for temporary storage and management of documents, files, and other data wherein such services are charged based on the number of pages stored.

Further, in accordance with the present invention, there is provided a system and method for temporary storage and management of documents, files, and other data wherein such services are charged at the commencement of the services, rather than each day.

Further, in accordance with the present invention, there is provided a system and method for temporary storage and management of documents, files, and other data wherein such services are charged based on the fees applicable to where the services are accessed.

Further, in accordance with the present invention, there is provided a system and method for temporary storage and management of documents, files, and other data wherein such services are able to be renewed and such renewal fees are the fees charged when the services were first accessed.

In the present invention, a mobile user is provided access to a multifunctional peripheral device in a non-office environment, such as an airport lounge, self-service kiosk, retail establishment, or hotel business center. The user is provided information about the various storage and management services available. The user then selects the appropriate payment option. The user then provides selected information about the service the user wants to be performed. The user is then presented with the total cost of the service. Upon the user accepting the charges, the service is performed. The details of the transaction are archived and the user is billed for the service. The fees charged are based on the number of pages of the document, file, or other data stored. The fees are charged at the commencement of the services, rather than each day. The fees are also based on the location form which the services are accessed based on selected criteria of such location. In one embodiment, the user is able to renew the storage duration and preferably, such renewal fees are those fees charged when the document, file, or other data was first stored.

In accordance with the present invention, there is provided a data service management system for electronic files. The system includes communications means having receiving means adapted to receive an electronic data file. The system also includes receiving means adapted to receive request data that specifies a desired operation in connection with the electronic data file. The system further includes calculation means adapted to calculate cost data representing a fee associated with the desired operation as specified by the request data. The communications means of the subject system also comprise means adapted to communicate the cost data to an associated user and means adapted to receive order data denoting the acceptance of the cost data for performing the desired operation. The system also includes commencement means adapted to commence the desired operation according to the request data.

Further in accordance with the present invention, there is provided a method for data service management of electronic files. The method begins by receiving at least one electronic data file and receiving request data. The request data specifies a desired operation in connection with the at least one electronic data file. Next, cost data is calculated representing a fee associated with the desired operation specified by the request data. The cost data is then communicated to an associated user. Order data is subsequently received denoting the acceptance of the cost data for performing the desired operation from the associated user. The desired operation is then performed in accordance with the received request data.

Still other aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

The present invention is directed to a system and method for providing fee-based data services to mobile users. More particularly, the present invention is directed to a system and method for managing and charging for data storage devices.

Figure 1:
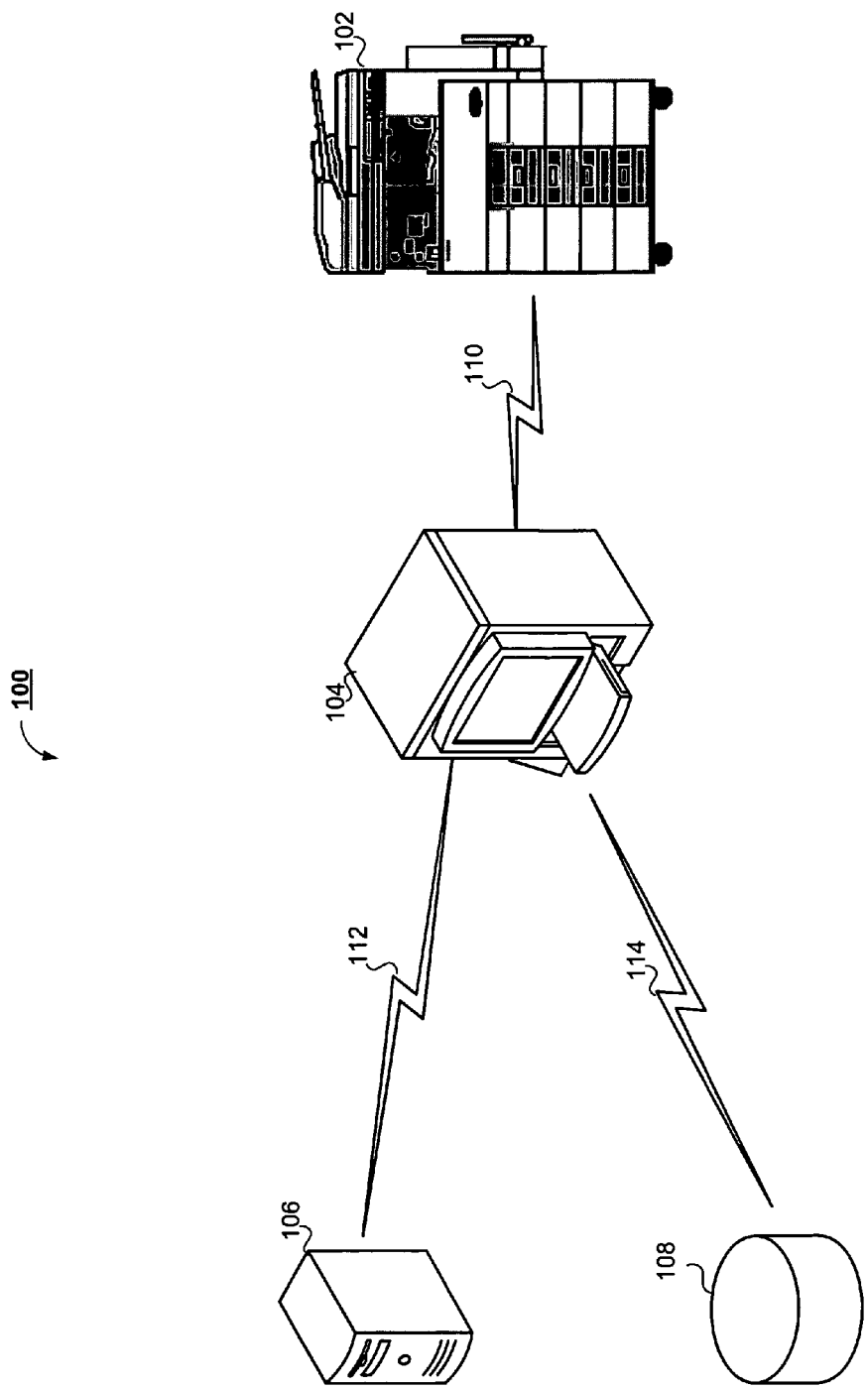
FIG. 1 is a block diagram illustrating a system for accessing fee-based data services by mobile users in accordance with the present invention.

Turning now to FIG. 1, there is illustrated a block diagram of a system 100 is shown in FIG. 1. In the present invention, a mobile user is provided access to one or more multifunctional peripheral devices, shown in FIG. 1 as the multifunctional peripheral device 102. As illustrated in FIG. 1, the multifunctional peripheral device 102 is suitably located in a non-office environment, such as an airport lounge, retail location, or business center. Other non-office environment locations include, but are not limited to, university campuses, conference centers, libraries, and hotels. The user accesses the multifunctional peripheral device 102 directly or via a computer or kiosk 104 using a suitable communications link 110. It will be appreciated by those skilled in the art that the multifunctional peripheral devices are any suitable multifunctional peripheral device known in the art, such as a copier, printer, scanner, facsimile and the like, or any combination thereof. Suitable commercially available multifunctional peripheral devices include, but are not limited to, the Toshiba e-Studio Series Controller. It will further be understood by those skilled in the art that while the present description employs a single multifunctional peripheral device 102, the present invention is not limited thereto. For example and without limitation, the present invention is equally capable of using multiple multifunctional peripheral devices suitably interconnected using any means known in the art, including, without limitation, the Internet, local area network, wide area network and the like.

A user interface is presented on the device or computer allowing the user to access the devices and associated services. In the preferred embodiment, the user interface is a touch screen display, capable of both displaying data to a user, as well as receiving user input. It will be understood by those skilled in the art that any suitable user interface known in the art, including, but not limited to an alphanumeric keypad, an LCD, and the like, are equally capable of being employed by the present invention. In another embodiment, the user accesses the multifunctional peripheral device via a wireless device and connects using at least one of Bluetooth® standard, 802.11g (WiFi) and other 802.11 compliant devices. As will be understood by those skilled in the art, the communications link 110 is any means for communication between electronic devices, including for example and without limitation, an Ethernet based network, infrared connection, Wi-Fi connection or other 802.11(x)-based wireless connection, telephone connection, cellular connection, Bluetooth® standard-based connection and the like or any combination of communication means thereof.

The multifunctional peripheral device 102 is communicatively coupled to an associated central server 106 via a suitable communications link 112, such as the Internet. As shown in FIG. 1, the multifunctional peripheral device 102 suitably employs the kiosk 104 to facilitate data communication with the central server 106, however the present invention is equally adaptable to using direct communication between the device 102 and the central server 106, without using the kiosk 104. Preferably, the central server 106 and the kiosk 104 suitably communicate via the communications link 112. As will be understood by those skilled in the art, the communications link 112 is any means for communication between electronic devices, including for example and without limitation, a telephone connection, a cellular connection, an infrared connection, a Wi-Fi connection or other 802.11(x)-based wireless connection, an Ethernet based network, a Bluetooth® standard-based connection and the like or any combination of communication means thereof.

Upon the initial access of the multifunctional peripheral device 102 via the kiosk 104, as addressed above, the user is provided with information about the services available to be performed. The information is provided in any suitable manner known in the art. The information is suitably provided by way of a user interface associated with the multifunctional peripheral device or documentation provided related thereto. In the preferred embodiment, the kiosk 104 suitably displays, via any means known in the art, the services to the user using an associated user interface device. The services provided to the user are those typically provided by multifunctional peripheral devices and associated software. In one embodiment, the system allows the user to generate or receive image data using the multifunctional peripheral device and then stores or archives such image data in an associated repository.

In another embodiment, the system allows the user to generate or receive image data using the multifunctional peripheral device, perform optical character recognition on the image data, and then transmit the image data to at least one selected destination. In a further embodiment, the system allows the user to generate or receive image data and then distribute the image data to at least one selected destination. In yet another embodiment, the system allows the user to generate or receive image data and then to print the image data according to the parameters selected by the user.

In a preferred embodiment, the user is then provided with information about the available payment options for paying for the desired services. The user then selects the desired payment option from the options provided. After selecting the desired payment option, the user is prompted to provide selected information about the desired service to be performed. Once the user has accepted the services by any suitable means known in the art, the services are performed. The user is then billed for the services performed depending on the payment option selected by any suitable means known in the art.

As shown in FIG. 1, the system 100 further includes a storage device 108, communicatively coupled to the kiosk 104. It will be understood by those skilled in the art that the storage device 108 is any suitable means of storing electronic data files known in the art, including, without limitation, optical data storage, magnetic data storage, flash memory, hard disk drives, and the like. Preferably, the storage device 108 is a document management system, capable of storing one or more electronic documents or files and providing access thereto. The storage device 108 advantageously receives electronic file data from the kiosk 104 for storage thereon. In the preferred embodiment, the device 108 is suitably adapted to receive image data from a scanned or uploaded document by the multifunctional peripheral device 102. As will be appreciated by those skilled in the art, the kiosk 104 is capable of receiving any form of removable storage media, such as floppy disk, Universal Serial Bus devices, optical disks, and the like, and accessing the data stored thereon.

When removable storage media is received by the kiosk 104, the data files are suitably displayed to an associated user via the user interface. The user selects the file or files to be centrally stored and thereby accessible on the storage device 108. The file or files are then transmitted to the storage device 108 for storage thereon. The user is then charged for the length of time for which the file or files will be stored on the storage device 108. Preferably, the user is charged upon the commencement of the storage. In addition, the amount charge suitably varies in accordance with the location from which the document or file originates, as well as where the document or file is to be stored. For example, and without limitation, the present invention suitably charges different rates based upon where the storage device 108 is physically located, such as proximity to the user, availability of overseas access, local operating expenses, and the like. Alternatively, the user is charged an initial rate for the day and is subsequently billed for each additional day of storage. In another embodiment, the user is charged on a per page basis for a predetermined period of time. It will be understood by those skilled in the art that while previously described as being input into the kiosk 104, the present invention allows for the insertion or receipt of removable storage media by the multifunctional peripheral device 102, and the preceding description is equally applicable thereon.

When the file or files to be stored on the storage device 108 are not present in electronic form, a user accesses the multifunctional peripheral device 102, and selects the appropriate function, such as for example, scan to storage or the like. The multifunctional peripheral device 102 then scans the original document to generate image data, which is then transmitted, via the kiosk 104, to the storage device 108. It will be appreciated by those skilled in the art that although illustrated in FIG. 1 as using the kiosk 104 to communicate with the server 106 and the storage device 108, the multifunctional peripheral device 102 is equally capable of direct communications with both the server 106 and the storage device 108. The corresponding costs associated with the storage of the generated image files is discussed in detail below.

Figure 2:
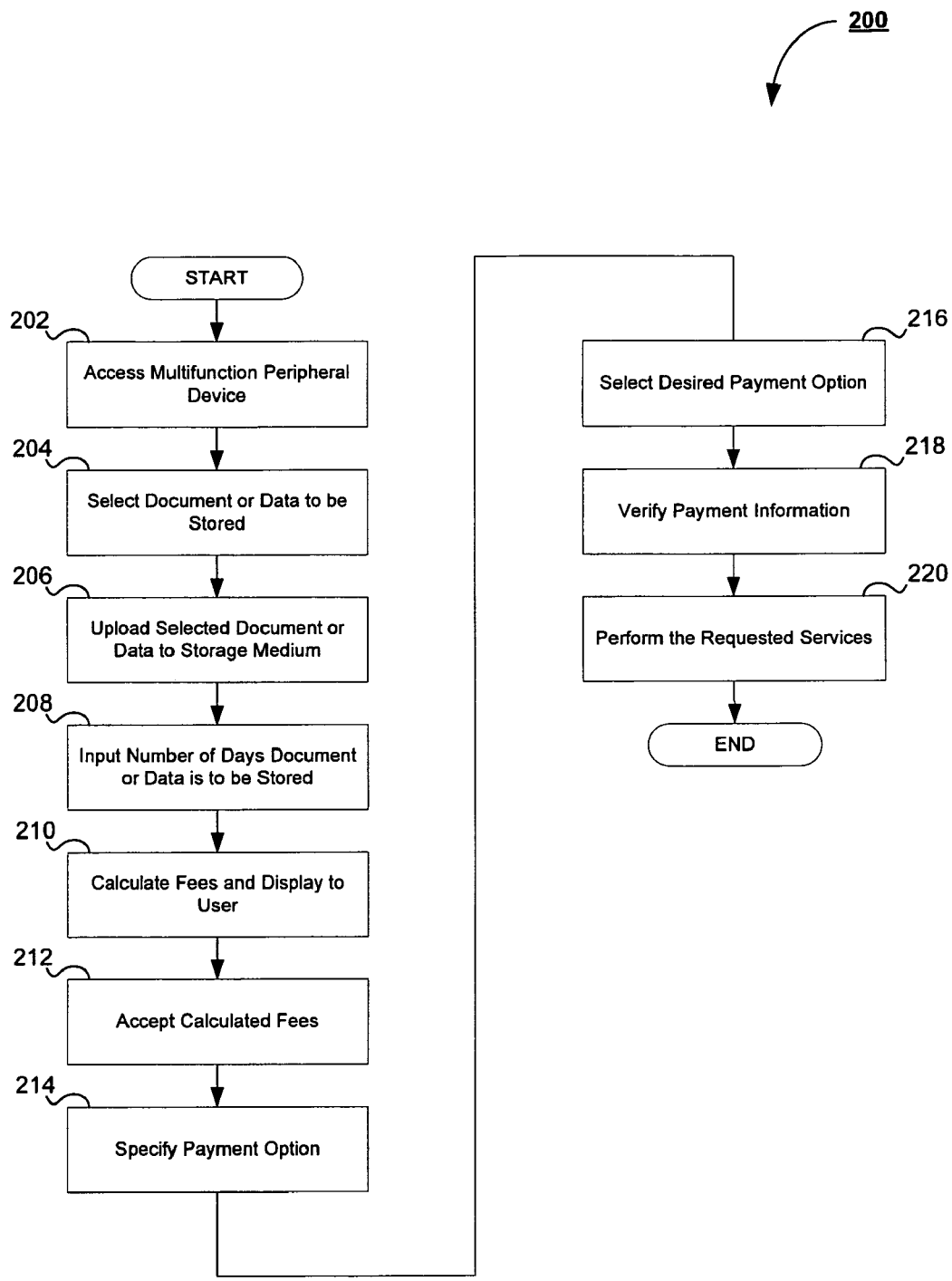
FIG. 2 is a flow chart illustrating a method for managing and charging for data storage devices in accordance with the present invention.

Turning now to FIG. 2, there is shown a flow chart 200 illustrating a method managing and charging for data storage devices in accordance with the present invention. The method begins at step 202, wherein the user accesses the multifunctional peripheral system through the user interface via any means known in the art. Preferably, the user accesses the multifunctional peripheral system via an Internet connected computer or device. Alternatively, the user accesses the system via the kiosk 104. The user then selects, at step 204, the document or data to be stored in accordance with the present invention. In the preferred embodiment, the user selects the data or document file using a graphical user interface. It will be understood by those skilled in the art that the graphical user interface is suitably displayed on the kiosk 104, the multifunctional peripheral device 102, an Internet connected computer or device, and the like. At step 206, the selected document or data is uploaded to the storage device 108 via any suitable means. As will be understood by the skilled artisan, the document or data is capable of being uploaded from a removable storage medium, an Internet connected device hard disk drive, an electronic message attachment, and the like. In accordance with the present invention, the location from which the file is uploaded to storage impacts the pricing structure employed in determining the costs for storage, as discussed below. The user then inputs, at step 208, the number of days that the document or data file is to be stored. Preferably, the user selects the duration of storage using the graphical user interface, as described above.

At step 210, the system calculates the appropriate charges via any suitable means and presents the charges to the user via any suitable means for user approval. The fee is calculated based on the number of pages of the document, the number of storage days selected, and preferably, the price per page for documents originating from non-system service locations. In addition thereto, the location from which the document or file is uploaded to the storage device 108, the location of the storage device 108, and other location-based data further factor in determining the costs associated with storing the document or file. Preferably, the charges are presented to the user via the user interface of the kiosk 104. Alternatively, when remotely accessed by an Internet connected device, the charges are displayed via the associated web browser or other graphical user interface of such a device. The user then accepts the charges at step 212 via any means known in the art. The user is subsequently prompted to specify a payment option via any suitable means at step 214, as well as providing the necessary information corresponding to the selected payment option. Suitable payment options include, but are not limited to, credit card, debit card, funds transfer, pre-paid account debit, coupon submission, promotional offering, cash, and the like. As will be understood by those skilled in the art, necessary information suitably includes, but is not limited to, billing address information, account numbers, telephone numbers, and the like.

At step 216, the user selects the desired payment option via any suitable means and provides the information required to effectuate such payment via any suitable means. The system then verifies the payment information received from the user at step 218. As will be understood by those skilled in the art, verification includes, but is not limited to, verifying the account numbers, expiration dates, promotional codes, and the like. Upon verification of the payment information as shown at step 220, the system performs the requested services. It will be appreciated by those skilled in the art that the user is charged upon the commencement of the storage. The foregoing method will better be understood in connection with the screen template illustrated in FIG. 6.

Figure 6:
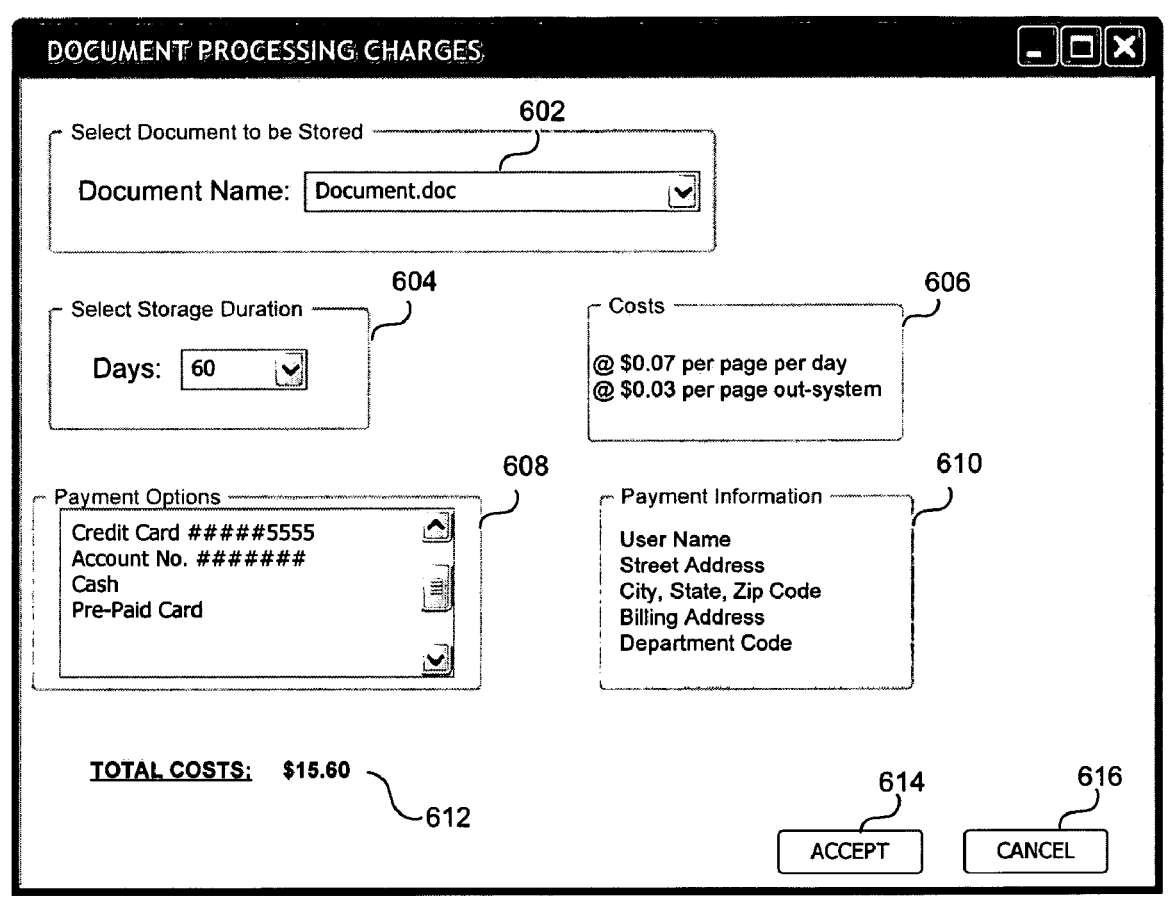
FIG. 6 is a screen template illustrating a user interface in accordance with the present invention.

As shown in FIG. 6, there is a screen template 600 for selecting a document or electronic data file to be stored in accordance with the present invention. The user is prompted to select the document to be stored on the storage device 108 from the pull-down menu 602. As will be understood by those skilled in the art, the list populating the pull-down menu 602 suitably comprises those files present on the removable storage medium or Internet connected device from which the user designates as the origin of the file to be stored. The user is also able to select from a pull-down menu 604 the number of days that the document or data file is to be stored. As illustrated in FIG. 6, the user has selected a 60 day duration, however, other longer or shorter periods of storage are equally capable of being selected by the user and the present invention is not limited only to 60 days. The costs are suitably calculated and displayed to the user in the cost box 606, as shown in FIG. 6. As will be appreciated by those skilled in the art, the costs suitably depend upon the duration of the storage, the number of pages of the document, whether the document was generated off-site, where the storage device 108 is located, where the multifunctional peripheral device 102 is located, whether the document is uploaded remotely from the kiosk 104, and the like. Other factors, not enumerated in FIG. 6, are equally capable of influencing the charges incurred by the user, without departing from the scope of the present invention.

The user is then prompted to select one of the payment options available, distinguished in the scroll-menu 608. As previously addressed, suitable payment options include, but are not limited to, credit card, debit card, pre-paid accounts, promotional accounts, cash, and the like. The corresponding payment information is displayed to the user in text box 610. In accordance with the present invention, the user is prompted to input the correct payment information using any means known in the art. For example, and without limitation, a pop-up window, secondary screen, split-pane, and the like, are capable of being employed by the present invention to input the necessary payment information corresponding to the selected payment method. Preferably, the multifunctional peripheral device 102, or kiosk 104 advantageously incorporates a magnetic card reader, or the like, capable of collecting such payment information from a credit or debit card. The total costs associated with the storage transaction are displayed to the user at 612. The user is then able to accept the charges by selecting the accept icon 614 or alternatively cancel the pending operation by selecting the cancel icon 616.

Figure 3:
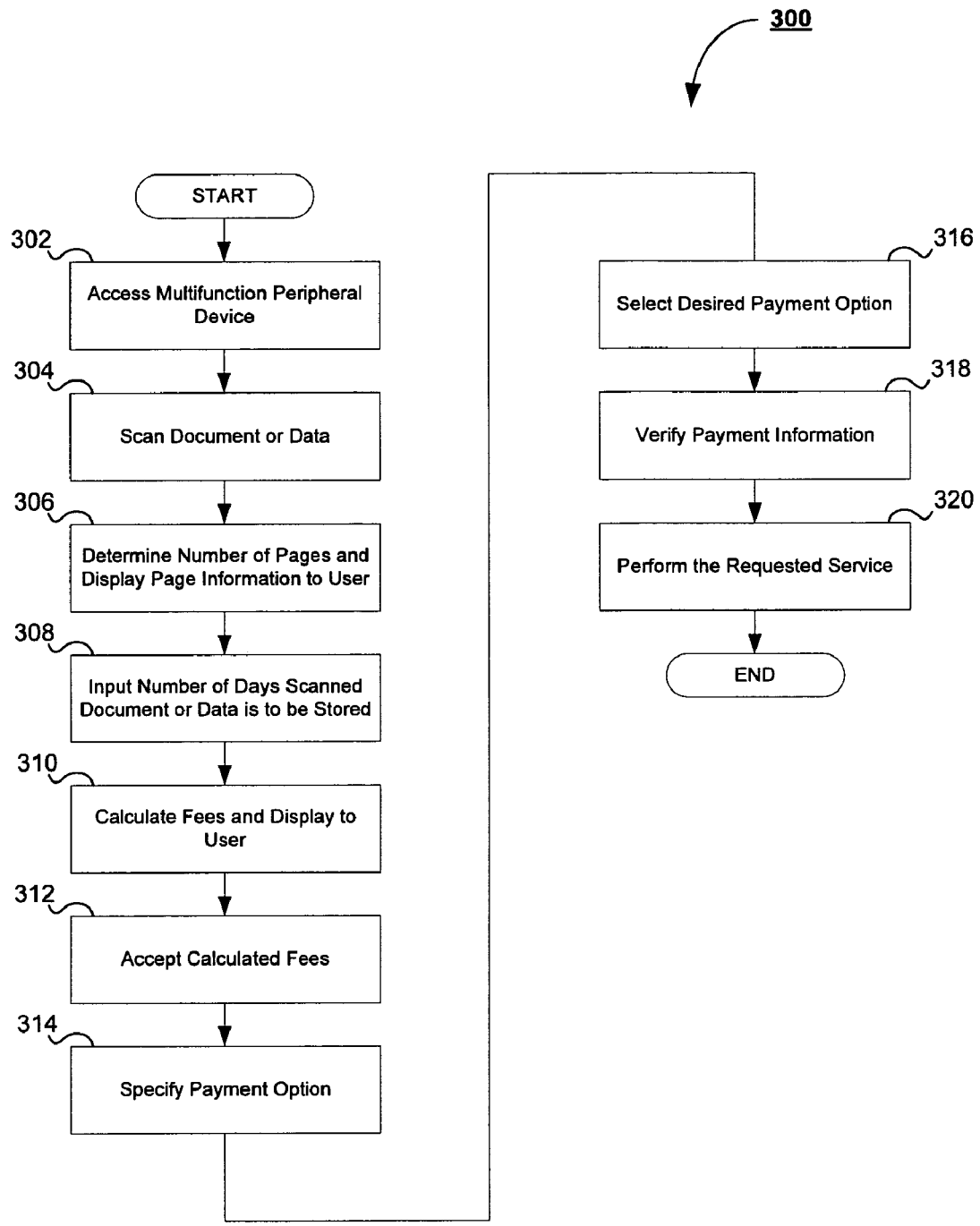
FIG. 3 is a flow chart illustrating a method for managing and charging for data storage devices in accordance with the present invention.

Referring now to FIG. 3, there is shown a flow chart 300 illustrating a method managing and charging for data storage devices in accordance with the present invention. The method begins at step 302, wherein the user accesses the multifunctional peripheral system via the user interface of the kiosk 104 associated with the multifunctional peripheral device 102. In this particular embodiment, the document or data to be stored is not available in electronic copy and must first be generated by the multifunctional peripheral device 102. Accordingly, at step 304, the user scans the document or data into the multifunctional peripheral device 102 or otherwise communicates the document or data to the multifunctional peripheral device 102. The system computes, at step 306, the number of pages and provides the information to the user via any suitable means. Preferably, the number of pages are suitably displayed via the kiosk 104 user interface. At step 308, the user inputs the number of days that the document or data is to be stored via any suitable means.

At step 310, the system calculates the appropriate charges via any suitable means and presents the charges to the user via any suitable means for user approval. The fee is calculated based on the number of pages of the document, the number of storage days selected, and preferably, the price per page for documents originating from that location. At step 312, the user accepts the transaction via any suitable means. At step 314, the user is prompted to specify a payment option via any suitable means and to provide the necessary information for the associated payment option. As will be appreciated by those skilled in the art, suitable payment options include, but are not limited to, credit card, debit card, funds transfer, pre-paid account debit, coupon submission, promotional offering, cash, and the like. It will further be appreciated by the skilled artisan that the necessary information suitably includes, but is not limited to, billing address information, account numbers, telephone numbers, and the like.

At step 316, the user selects the desired payment option via any suitable means and provides the information required to effectuate such payment via any suitable means. At step 318, the system verifies the payment information received from the user. As will be understood by those skilled in the art, verification includes, but is not limited to, verifying the account information, the expiration dates, the validity of the promotional codes, and the like. Upon verification of the payment information as shown at step 320, the system performs the requested services. The foregoing method will better be understood in connection with the screen template illustrated in FIG. 7.

Figure 7:
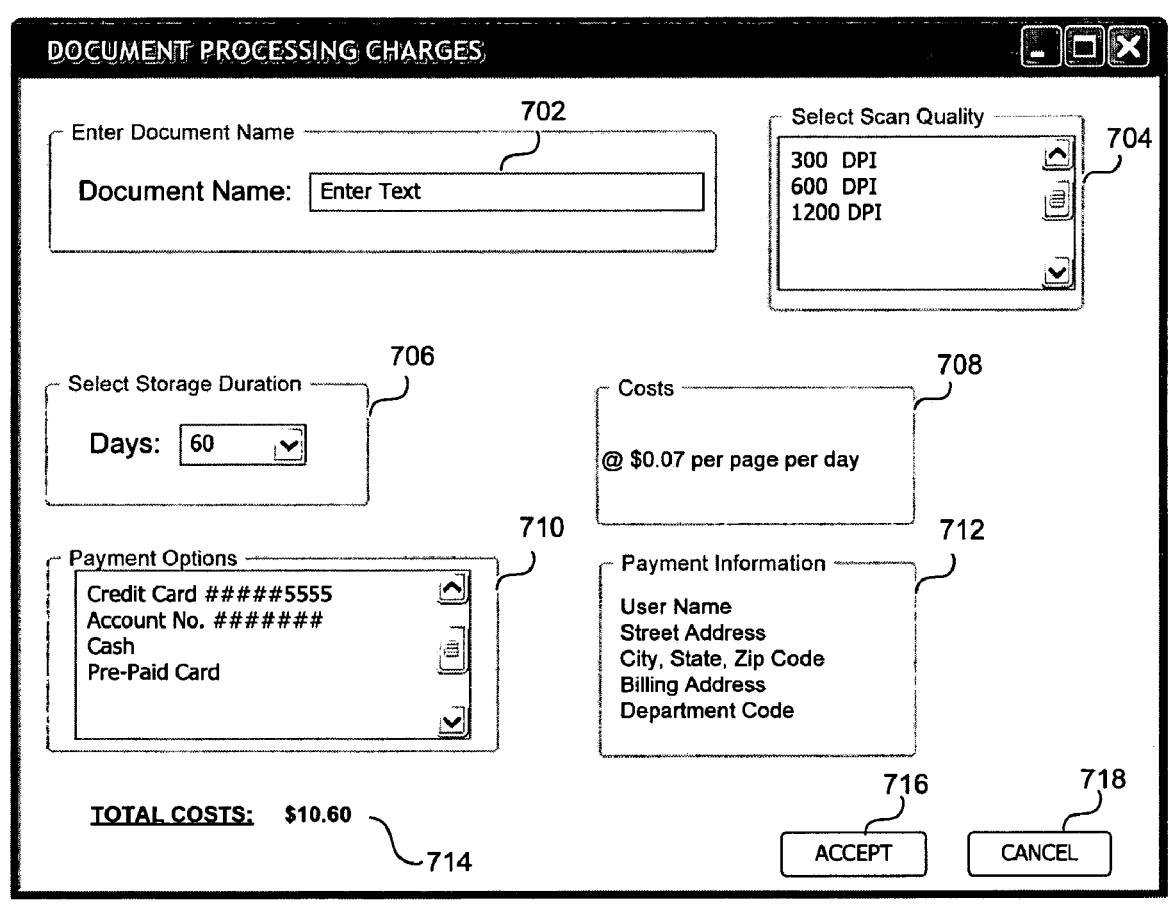
FIG. 7 is a screen template illustrating a user interface in accordance with the present invention.

As shown in FIG. 7, there is a screen template 700 for scanning or otherwise uploading a document or electronic data file to be stored in accordance with the present invention. The user is prompted to select a name under which the file is to be stored on the storage device 108 from the pull-down menu 702. When scanning is required to generate an electronic form of the document or data to be stored, the user is prompted to select a scanner resolution from the scroll-down menu 704. As will be appreciated by those skilled in the art, the available resolutions will vary depending upon the capabilities of the associated multifunction peripheral device 102 and the listing shown in FIG. 7 is for example purposes and not to limit the available resolutions. The user is also able to select from the pull-down menu 706 the number of days that the user desires the document or data file to be stored. As illustrated in FIG. 7, the user has selected 60 days of storage, however, it will be understood by those skilled in the art that other longer or shorter periods of storage are equally capable of being selected by the user and the present invention is not limited only to 60 days. The costs are suitably calculated and displayed to the user in the cost box 708. As will be appreciated by those skilled in the art, the costs suitably depend upon the duration of the storage, and the number of pages of the document. Other factors, not enumerated in FIG. 7, are equally capable of influencing the charges incurred by the user, without departing from the scope of the present invention.

The user is then selects one of the available payment options, as illustrated in the scroll-menu 710. As previously addressed, suitable payment options include, but are not limited to, credit card, debit card, pre-paid accounts, promotional accounts, cash, and the like. The corresponding payment information is displayed to the user in text box 712. In accordance with the present invention, the user is prompted to input the correct payment information using any means known in the art. For example, and without limitation, a pop-up window, secondary screen, split-pane, and the like, are capable of being employed by the present invention to input the necessary payment information corresponding to the selected payment method. Preferably, the multifunctional peripheral device 102, or kiosk 104 advantageously incorporates a magnetic card reader, or the like, capable of collecting such payment information from a credit or debit card. The total costs associated with the storage transaction are displayed to the user at 714. The user is then able to accept the charges by selecting the accept icon 716 or alternatively cancel the pending operation by selecting the cancel icon 718.

Figure 4:
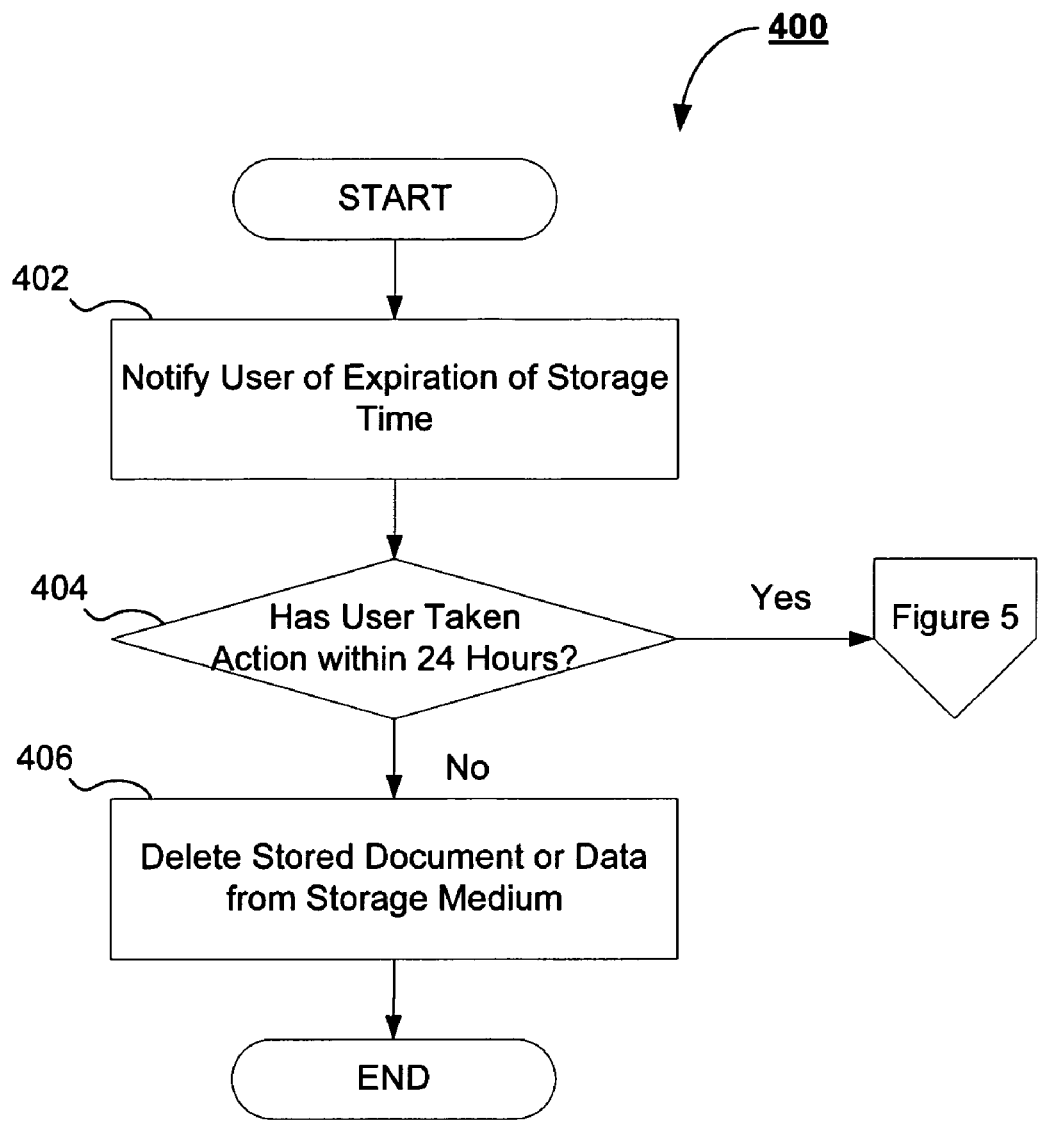
FIG. 4 is a flow chart illustrating a method for managing and charging for data storage devices in accordance with the present invention.

Turning now to FIG. 4, there is shown a flow chart 400 illustrating a method managing and charging for data storage devices in accordance with the present invention. The user is first notified at step 402 that the storage duration for the user's document will expire in 24 hours and that the document will be deleted upon such expiration. As will be understood by those skilled in the art, suitable notification is accomplished by electronic messaging, electronic mail, text messaging, and the like. Those skilled in the art will further understand that the present invention is not limited to a 24 hour period, and other time frames, as established by an administrator, are equally capable of being used in accordance with the present invention. A determination is then made at step 404, whether the user has initiated any action within 24 hours of the deletion notice. If the user has not taken any action within the 24 hour period, flow proceeds to step 406, wherein the document or data is deleted from the storage device 108 via any suitable means. If the user has taken action in response to such deletion notice, flow proceeds to the method described in the flow chart of FIG. 5.

Figure 5:
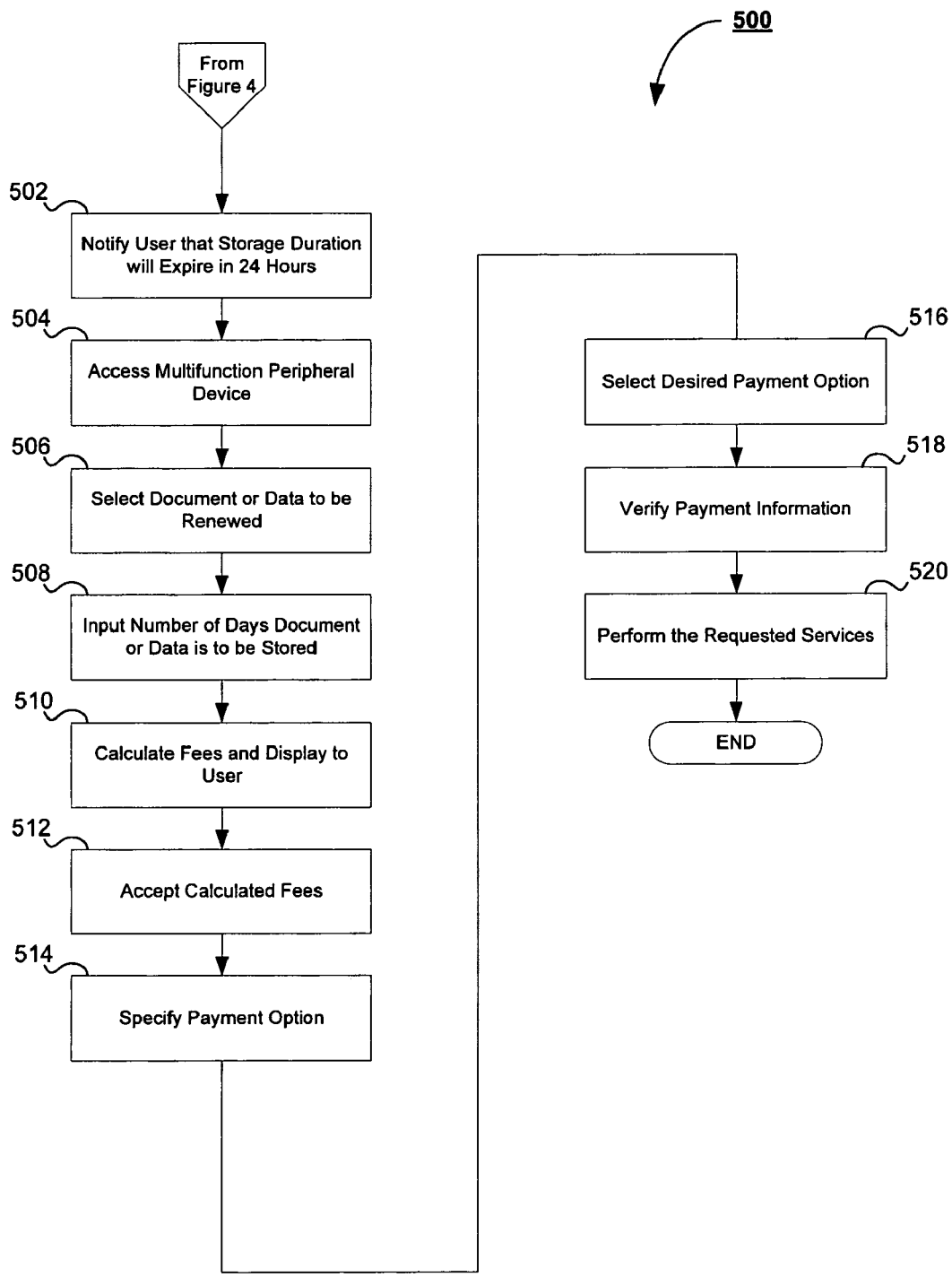
FIG. 5 is a flow chart illustrating a method for managing and charging for data storage devices in accordance with the present invention.

Referring now to FIG. 5, there is shown a flow chart 500 illustrating a method for managing and charging for data storage devices in accordance with the present invention. Beginning at step 502, the user is suitably notified, via any suitable means, that the storage duration for the user's document or data will expired in a predetermined period of time. Preferably, the notification means includes, but is not limited to, text messaging, electronic mail, electronic messaging, and the like. More preferably, the notification is transmitted to the user 24 hours prior to the expiration of the storage. It will be understood by those skilled in the art that other time periods are equally capable of being employed in accordance with the present invention, and the subject invention need not be limited to a 24 hour period. At step 504, the user accesses the multifunctional peripheral system through the user interface via an Internet connected computer or device. Alternatively, the user is able to access the multifunctional peripheral system via the kiosk 104. The user then selects, at step 506, the document or data to be renewed. At step 508, the user inputs the number of days that the document or data is to be stored via any suitable means. Preferably, the new time limitation is input via a user interface, such as the touch screen display of the kiosk 104, the multifunctional peripheral device 102, or the web browser of the Internet connected device.

At step 510, the system calculates the appropriate charges via any suitable means and presents the charges to the user via any suitable means for user approval. The fee is calculated based on the number of pages of the document, the number of storage days selected, and preferably the price per page charged when the document was originally stored. It will be understood by those skilled in the art, however, that the price per page charged is suitably also a different price than the price originally charged. At step 512, the user accepts the transaction via any suitable means. Preferably, the user accepts the transaction using one of the available user interfaces, as described above. At step 514, the user is prompted to specify a payment option via any suitable means and to provide the necessary information for the associated payment option. Suitable payment options include, but are not limited to, credit card, debit card, funds transfer, pre-paid account debit, coupon submission, promotional offering, cash, and the like. As will be appreciated by those skilled in the art, necessary information suitably includes, but is not limited to, account numbers, telephone numbers, billing address information, and the like.

At step 516, the user selects the desired payment option via any suitable means and provides the information required to effectuate such payment via any suitable means. At step 518, the system verifies the payment information received from the user. Upon verification of the payment information as shown at step 520, the system performs the requested services.

While FIG. 5 illustrates the process for renewing or extending the retention period of a document or data once the user has received an notification that the storage period will expire, it will be understood by one skilled in the art that the retention period is suitably renewed or extending during the retention period as shown in FIG. 5. In the event that such renewal or extension does not occur during the retention period, the document or data is suitably deleted from the storage device 108 as set forth above. The foregoing method will better be understood in connection with the screen template illustrated in FIG. 8.

Figure 8:
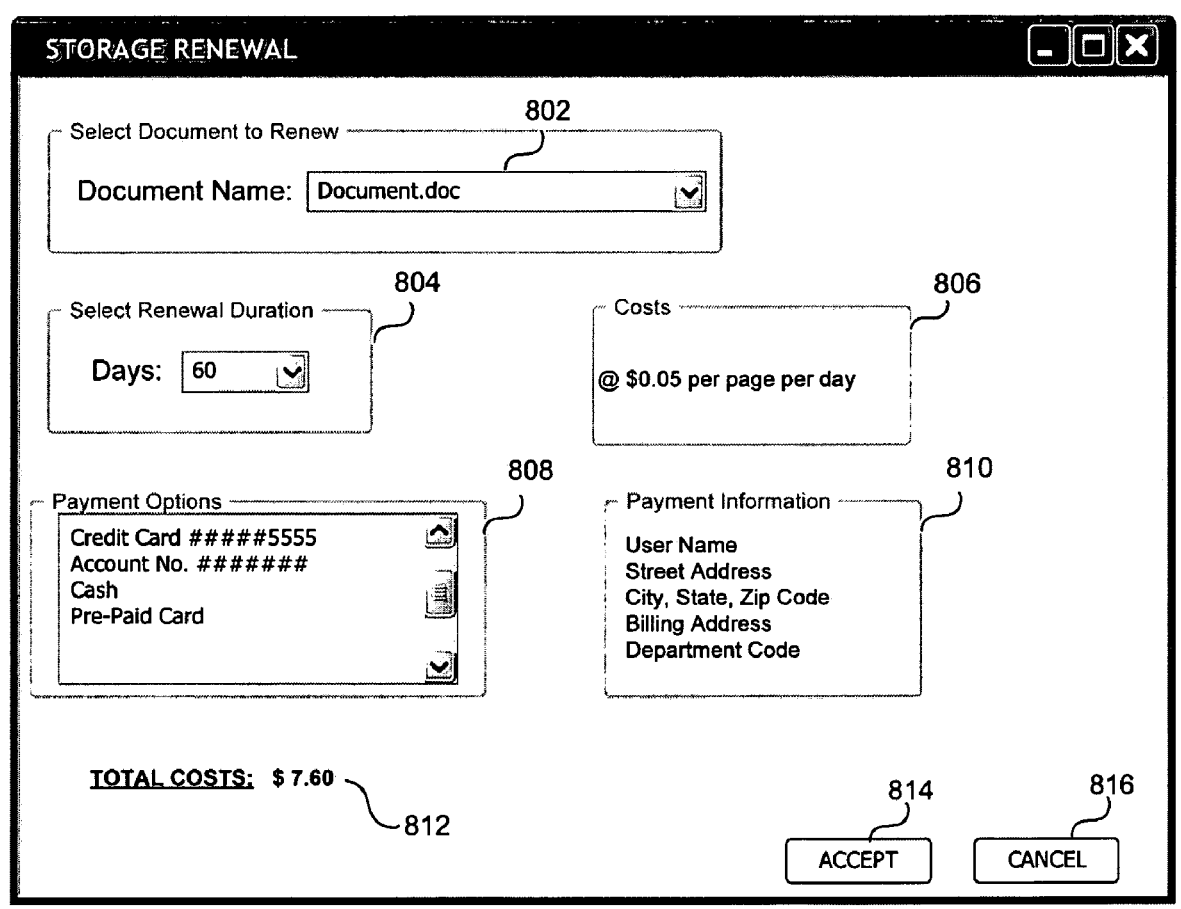
FIG. 8 is a screen template illustrating a user interface in accordance with the present invention.

As shown in FIG. 8, there is a screen template 800 for renewing a document or electronic data file stored in accordance with the present invention. The user is prompted to select the document presently stored on the storage device 108 for renewal from the pull-down menu 802. As will be understood by those skilled in the art, the list populating the pull-down menu 802 suitably comprises those files present on the storage device 108 associated with the user and presently nearing the end of their storage periods. The user then selects from a pull-down menu 806 the number of days for which the document or data file is to be renewed. In accordance previous screen examples of FIG. 6 and FIG. 7, the user selects, in FIG. 8, an additional 60 day renewal period. It will be understood by those skilled in the art that other longer or shorter periods are also capable of being selected by the user. The costs associated with the renewal are suitably calculated and displayed to the user in the cost box 806. As will be appreciated by those skilled in the art, the costs suitably depend upon the duration of the storage, the number of pages of the document, and the like. Other factors, not enumerated in FIG. 8, are equally capable of influencing the charges incurred by the user, without departing from the scope of the present invention. Preferably, the costs associated with the renewal are the same as those charged when the document or electronic data file was first stored.

The user is then prompted to select one of the payment options from the scroll-menu 608. Suitable payment options include, but are not limited to, credit card, debit card, pre-paid accounts, promotional accounts, cash, and the like. The corresponding payment information is displayed to the user in text box 810. In accordance with the present invention, the user is prompted to input the correct payment information using any means known in the art. For example, and without limitation, a pop-up window, secondary screen, split-pane, and the like, are capable of being employed by the present invention to input the necessary payment information corresponding to the selected payment method. Preferably, the multifunctional peripheral device 102, or kiosk 104 advantageously incorporates a magnetic card reader, or the like, capable of collecting such payment information from a credit or debit card. The total costs associated with the storage transaction are displayed to the user at 812. The user is then able to accept the charges by selecting the accept icon 814 or alternatively cancel the pending operation by selecting the cancel icon 816.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A data service management system for electronic files comprising:
   a processor and memory associated therewith;
   communication means, the communication means including receiving means adapted for receiving at least one electronic data file via at least one selected physical location selected from a plurality thereof;
   means adapted for receiving request data, wherein request data specifies a desired data storage operation in connection with the at least one electronic data file;
   means adapted for receiving, at a central location, location data corresponding to a geographical location of each of a plurality of remote document input locations, including the at least one selected physical location, from which plurality of remote document input locations the at least one electronic data file is communicated via the communication means;
   means adapted for receiving location cost data corresponding to a fee structure for electronic document storage, wherein location cost data corresponds to the location data associated with each received electronic data file and a number of pages associated therewith;
   means adapted for receiving duration data corresponding to a duration of storage for the electronic data file;
   calculation means adapted for calculating fee cost data representative of a fee associated with the desired data storage operation specified by the request data, a received location cost data, duration data, and cost per page;
   the communication means further including means adapted for communication of the fee cost data to an associated user;
   the communication means further including means adapted for receiving order data denoting acceptance by the user of the fee cost data for performing the desired data storage operation;
   means adapted for commencing the desired data storage operation at the central location corresponding to received location data in accordance with the request data;
   means adapted for assessing a charge for storage of the at least one electronic data file at the central location in accordance with the fee cost data;
   means adapted for generating a notification relative to termination of the data storage operation, the notification including a cost associated with an extension of the duration; and
   means adapted for extending the duration in accordance with a response received from a generated notification.

2. The data service management system for electronic files of claim 1 wherein the communication means further includes means for receiving, from the associated user, selection data representative of a selected payment method for the charge associated with the desired operation.

3. The data service management system for electronic files of claim 2 wherein the selected payment method is chosen from the group of payment options consisting of a credit card, a debit card, a funds transfer, a pre-paid account debit, a coupon submission and a promotional offering.

4. A method for data service management of electronic files comprising the steps of:
   receiving at least one electronic data file at least one selected physical location selected from a plurality thereof;
   receiving request data, wherein request data specifies a desired data storage operation in connection with the at least one electronic data file;
   receiving, at a central location, location data corresponding to a geographic location of each of a plurality of remote document input locations, including the at least one selected physical location, from which plurality of remote document input locations the at least one electronic data file is communicated;
   receiving location cost data corresponding to a fee structure for electronic document storage, wherein location cost data corresponds to the location data associated with each received electronic data file and a number of pages associated therewith;
   receiving duration data corresponding to a duration of storage from the electronic data file;
   calculating, using an associated processor operating in connection with instructions disposed in an associated memory, fee cost data representative of a fee associated with the desired data storage operation specified by the request data, received location cost data, duration data, and cost per page;
   communicating the fee cost data to an associated user;
   receiving order data denoting acceptance by the user of the fee cost data for performing the desired data storage operation;
   commencing the desired data storage operation at the central location corresponding to received location data in accordance with the request data;
   assessing a charge for storage of the at least one electronic data file at the central location in accordance with the fee cost data;
   generating a notification relative to termination of the data storage operation, the notification including a cost associated with an extension of the duration; and
   extending the duration in accordance with a response received from a generated notification.

5. The method for data service management of electronic files of claim 4, further comprising the step of receiving, from the associated user, selection data representative of a selected payment method for the charge associated with the desired operation.

6. The method for data service management of electronic files of claim 5, wherein the selected payment method is chosen from the group of payment options consisting of a credit card, a debit card, a funds transfer, a pre-paid account debit, a coupon submission and a promotional offering.

7. A computer-implemented method for data service management of electronic files comprising the steps of:
receiving at least one electronic data file at least one selected physical location;
receiving request data, wherein request data specifies a desired data storage operation in connection with the at least one electronic data file selected from a plurality thereof;
receiving, at a central location, location data corresponding to a geographic location of each of a plurality of remote document input locations, including the at least one selected physical location, from which plurality of remote document input locations the at least one electronic data file is communicated;
receiving location cost data corresponding to a fee structure for electronic document storage, wherein location cost data corresponds to the location data associated with each received electronic data file and a number of pages associated therewith;
receiving duration data corresponding to a duration of storage for the electronic data file;
calculating, using an associated processor operating in connection with instructions disposed in an associated memory, fee cost data representative of a fee associated with the desired data storage operation specified by the request data, received location cost data, duration data, and cost per page;
communicating the cost data to an associated user;
receiving order data denoting acceptance by the user of the fee cost data for performing the desired data storage operation;
commencing the desired data storage operation at the central location corresponding to received location data in accordance with the request data;
assessing a charge for storage of the at least one electronic data file at the central location in accordance with the fee cost data;
generating a notification relative to termination of the data storage operation, the notification including a cost associated with an extension of the duration; and
extending the duration in accordance with a response received from a generated notification.

8. The method for data service management of electronic files of claim 7, further comprising the step of receiving, from the associated user, selection data representative of a selected payment method for the charge associated with the desired operation.

9. The method for data service management of electronic files of claim 8, wherein the selected payment method is chosen from the group of payment options consisting of a credit card, a debit card, a funds transfer, a pre-paid account debit, a coupon submission and a promotional offering.

10. A system for data service management of electronic files comprising:
an input operable for receiving at least one electronic data file at least one selected physical location;
an input operable for receiving request data, wherein request data specifies a desired data storage operation in connection with the at least one electronic data file selected from a plurality thereof;
an input operable for receiving, at a central location, location data corresponding to a geographic location of each of a plurality of remote document input locations, including the at least one selected physical location, from which plurality of remote document input locations the at least one electronic data file is communicated;
an input operable for receiving location cost data corresponding to a fee structure for electronic document storage, wherein location cost data corresponds to the location data associated with each received electronic data file and a number of pages associated therewith;
an input operable for receiving duration data corresponding to a duration of storage for the electronic data file;
a processor operating in connection with instructions disposed in an associated memory, for calculating fee cost data representative of a fee associated with the desired data storage operation specified by the request data, received location cost data, duration data, and cost per page;
an output operable for communicating the cost data to an associated user;
an input operable for receiving order data denoting acceptance by the user of the fee cost data for performing the desired data storage operation;
the processor further operable for commencing the desired data storage operation at the central location corresponding to received location data in accordance with the request data;
the processor further operable for assessing a charge for storage of the at least one electronic data file at the central location in accordance with the fee cost data;
the processor further operable for generating a notification relative to termination of the data storage operation, the notification including a cost associated with an extension of the duration; and
the processor further operable for extending the duration in accordance with a response received from a generated notification.

11. The system for data service management of electronic files of claim 10, further comprising an input operable for receiving, from the associated user, selection data representative of a selected payment method for the charge associated with the desired operation.

12. The system for data service management of electronic files of claim 10, wherein the selected payment method is chosen from the group of payment options consisting of a credit card, a debit card, a funds transfer, a pre-paid account debit, a coupon submission and a promotional offering.

* * * * *